(12) United States Patent
Oren

(10) Patent No.: US 10,907,477 B2
(45) Date of Patent: Feb. 2, 2021

(54) CLIP AND PIN BALANCE FOR ROTOR

(71) Applicant: United Technologies Corporation, Farmington, CT (US)

(72) Inventor: Nicholas Waters Oren, Marlborough, CT (US)

(73) Assignee: RAYTHEON TECHNOLOGIES CORPORATION, Waltham, MA (US)

(*) Notice: Subject to any disclaimer, the term of this patent is extended or adjusted under 35 U.S.C. 154(b) by 185 days.

(21) Appl. No.: 16/011,056

(22) Filed: Jun. 18, 2018

(65) Prior Publication Data

US 2019/0383144 A1    Dec. 19, 2019

(51) Int. Cl.
| | |
|---|---|
| *F01D 5/02* | (2006.01) |
| *F04D 29/66* | (2006.01) |
| *F16F 15/34* | (2006.01) |

(52) U.S. Cl.
CPC .......... *F01D 5/027* (2013.01); *F04D 29/662* (2013.01); *F05D 2220/32* (2013.01); *F05D 2230/10* (2013.01); *F16F 15/34* (2013.01)

(58) Field of Classification Search
CPC .......... F01D 5/027; F16F 15/32; F16F 15/34; G01M 1/36; F04D 29/662
See application file for complete search history.

(56) References Cited

U.S. PATENT DOCUMENTS

| | | | | |
|---|---|---|---|---|
| 2,968,207 A | * | 1/1961 | Flogaus .............. | F16B 19/1081 411/45 |
| 3,056,631 A | * | 10/1962 | Mills ...................... | F16F 15/324 301/5.21 |
| 3,070,351 A | | 12/1962 | Hunt, Jr. | |
| 3,273,419 A | * | 9/1966 | Kollmann ............... | F01D 5/027 464/180 |
| 3,304,053 A | * | 2/1967 | Pagluica ................. | F01D 5/027 416/145 |
| 3,315,750 A | * | 4/1967 | Delaney .................. | F04D 29/34 416/144 |

(Continued)

FOREIGN PATENT DOCUMENTS

| | | |
|---|---|---|
| EP | 2169181 A2 | 3/2010 |
| EP | 2366907 A2 | 9/2011 |
| GB | 2454569 A | 5/2009 |

OTHER PUBLICATIONS

Extended European Search Report for EP Application No. 19169670.7 dated Nov. 7, 2019, pp. 1-5.

*Primary Examiner* — Kenneth J Hansen
*Assistant Examiner* — Brian O Peters
(74) *Attorney, Agent, or Firm* — Cantor Colburn LLP

(57) ABSTRACT

A balancing assembly for a rotating component of a gas turbine engine includes a balance pin configured for insertion into an opening in the rotating component, a balance clip configured for installation to the rotating component over the balance pin to retain the balance pin in the opening via exertion of a retention force on the balance pin. A method of correcting an imbalance of a rotating assembly includes inserting a balance pin into a balancing opening in a rotating component of the rotating assembly, and installing a balance clip at the balancing opening over the balance pin to retain the balance pin in the balancing opening via exertion of a retention force by the balance clip on the balance pin.

13 Claims, 5 Drawing Sheets

(56) References Cited

U.S. PATENT DOCUMENTS

| | | | | |
|---|---|---|---|---|
| 4,220,055 A | * | 9/1980 | Dubois | F01D 5/027 |
| | | | | 464/180 |
| 4,879,792 A | * | 11/1989 | O'Connor | F01D 5/027 |
| | | | | 29/889 |
| 5,388,963 A | | 2/1995 | Dimmick, III et al. | |
| 7,377,749 B2 | | 5/2008 | Charrier et al. | |
| 8,186,954 B2 | * | 5/2012 | Lee | F01D 5/027 |
| | | | | 416/144 |
| 8,459,147 B2 | * | 6/2013 | Harada | F16F 15/34 |
| | | | | 301/5.21 |
| 8,506,253 B2 | * | 8/2013 | Lecuyer | F01D 5/027 |
| | | | | 416/145 |
| 8,628,149 B2 | * | 1/2014 | Lussier | F16F 15/345 |
| | | | | 301/5.21 |
| 8,888,458 B2 | * | 11/2014 | Billings | F01D 5/027 |
| | | | | 416/144 |

* cited by examiner

CLIP AND PIN BALANCE FOR ROTOR

STATEMENT OF FEDERAL SUPPORT

This invention was made with Government support awarded by the United States. The Government has certain rights in the invention.

BACKGROUND

Exemplary embodiments of the present disclosure pertain to the art of gas turbine engines, and in particular to the balancing of rotating components of gas turbine engines.

Gas turbine engines include several rotating components such as rotor disks, cover plates, and the like. The rotating components and assemblies of rotating components, also referred to as modules, typical have requirements for balance about their axis of rotation. For component balance, material removal is often used to achieve requirements. At the assembly stage, however, space and foreign object damage considerations make material removal a less viable option to achieve assembly balance. As such, features are utilized that allow for localized weights to be removed or installed easily from the assembly. Typical configurations include counterweights that are riveted onto component flanges, balance rings, or weights that are installed via set screws. Such configurations, however, typically require special tooling such as a rivet flaring tool for installation of the weights, and the assembly must have space provisions to allow for use of the tool in the selected balance area. Such methods also make removal of balance weights difficult as well.

BRIEF DESCRIPTION

In one embodiment, a balancing assembly for a rotating component of a gas turbine engine includes a balance pin configured for insertion into an opening in the rotating component, a balance clip configured for installation to the rotating component over the balance pin to retain the balance pin in the opening via exertion of a retention force on the balance pin.

Additionally or alternatively, in this or other embodiments the balance clip includes two clip arms extending from a clip base. The clip arms are configured to extend along opposing sides of the rotating component.

Additionally or alternatively, in this or other embodiments a distance between the clip arms in a free state is less than a distance between the opposing sides.

Additionally or alternatively, in this or other embodiments a curved clip arm tip improves insertion of the balance clip onto the rotating component.

Additionally or alternatively, in this or other embodiments the balance pin includes a pin protrusion receivable into a clip opening in the balance clip.

Additionally or alternatively, in this or other embodiments a pin shoulder is defined in the balance pin at the pin protrusion.

Additionally or alternatively, in this or other embodiments one or more grooves or scallops are located in the balance pin.

In another embodiment, a rotating assembly of a gas turbine engine includes one or more rotating components including one or more balancing openings, and a balancing assembly located at a balancing opening of the one or more balancing openings. The balancing assembly includes a balance pin inserted into the balancing opening in the rotating component, and a balance clip installed to the rotating component over the balance pin to retain the balance pin in the balancing opening via exertion of a retention force on the balance pin.

Additionally or alternatively, in this or other embodiments the balance clip includes two clip arms extending from a clip base. The clip arms extending along opposing sides of the rotating component.

Additionally or alternatively, in this or other embodiments a distance between the clip arms in a free state is less than a distance between the opposing sides.

Additionally or alternatively, in this or other embodiments a curved clip arm tip improves insertion of the balance clip onto the rotating component.

Additionally or alternatively, in this or other embodiments the balance pin includes a pin protrusion receivable into a clip opening in the balance clip.

Additionally or alternatively, in this or other embodiments a pin shoulder is defined in the balance pin at the pin protrusion.

Additionally or alternatively, in this or other embodiments one or more grooves or scallops are located in the balance pin.

Additionally or alternatively, in this or other embodiments the one or more rotating components includes a turbine rotor.

In yet another embodiment, a method of correcting an imbalance of a rotating assembly includes inserting a balance pin into a balancing opening in a rotating component of the rotating assembly, and installing a balance clip at the balancing opening over the balance pin to retain the balance pin in the balancing opening via exertion of a retention force by the balance clip on the balance pin.

Additionally or alternatively, in this or other embodiments a pin protrusion of the balance pin is inserted into a clip opening of the balance clip to retain the balance clip at the balance pin.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
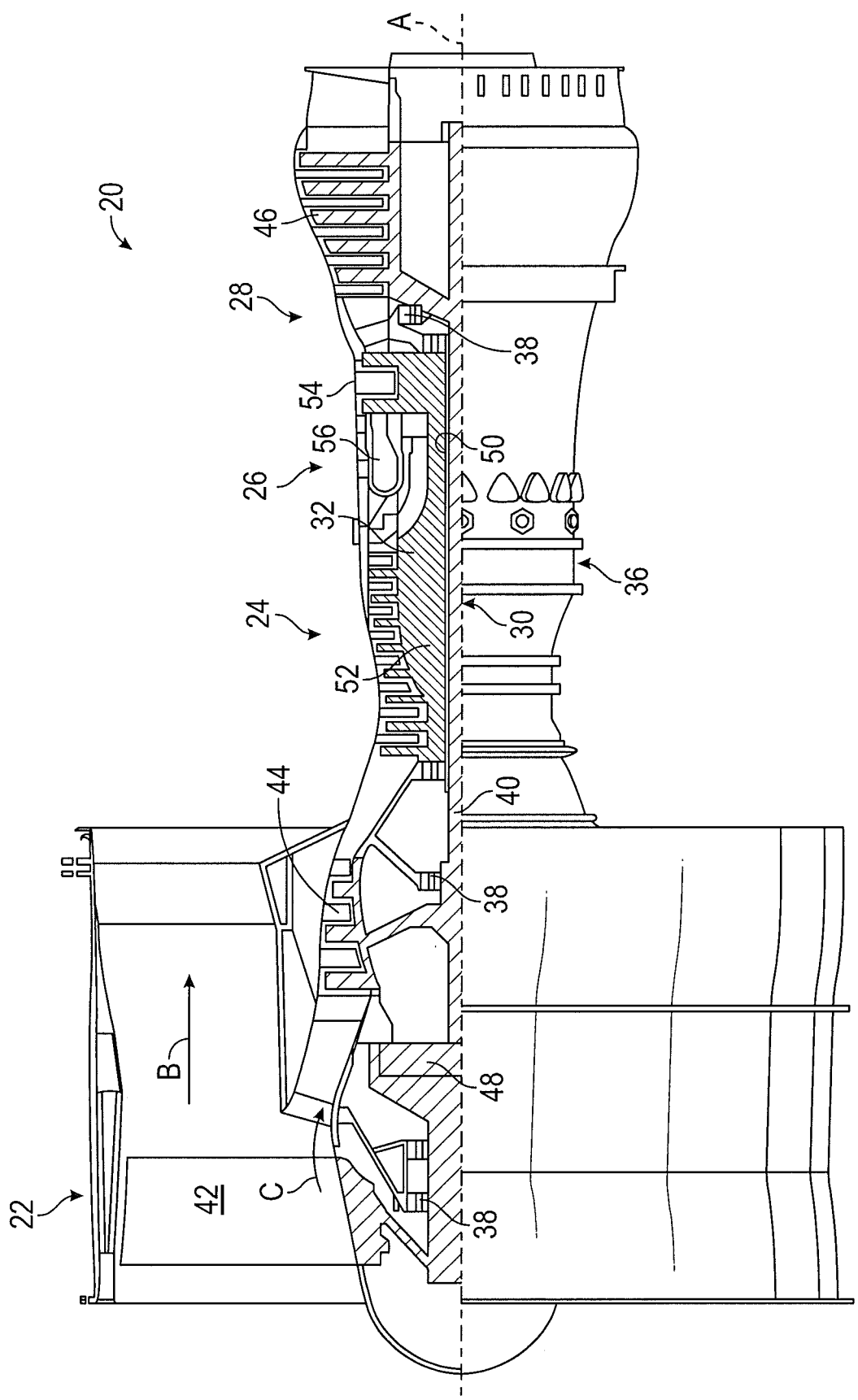
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
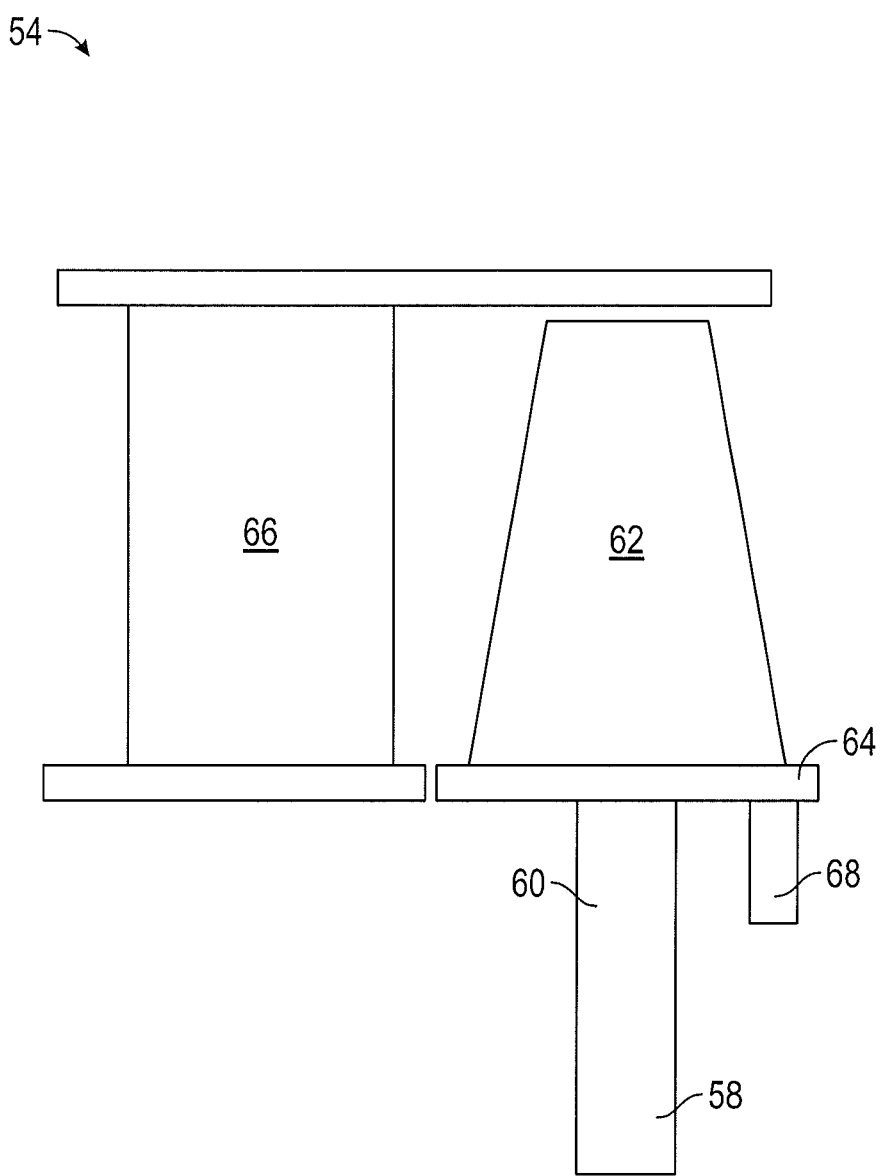
FIG. 2 is a partial cross-sectional view of a rotating component structure of a gas turbine engine.

Referring now to FIG. 2, a partial cross-sectional view of the high pressure turbine 54 is illustrated. While the following description is of a high pressure turbine 54, one skilled in the art will readily appreciate that the present disclosure may be applied to other rotating components of the gas turbine engine 20, such as the rotating components of the fan section 22, compressor section 24, or low pressure turbine 46. The high pressure turbine 54 includes a turbine rotor 58. The turbine rotor 58 includes a rotor disk 60 located at the engine central longitudinal axis A and a plurality of turbine vanes 62 extending radially outwardly from the rotor disk 60. In some embodiments, the turbine vanes 62 extend from a blade platform 64. The high pressure turbine 54 may further include one or more turbine stators 66 located upstream of the turbine rotor 58 as shown in FIG. 2, and/or may include one or more turbine stators located downstream of the turbine rotor 58.

The turbine rotor 58 includes one or more features configured to accommodate balance components, such as a balance flange 68 extending radially inwardly from the blade platform 64. It is to be appreciated that while the turbine rotor 58 includes a balance flange 68 to accommodate balance components, in other embodiments, features such as the rotor disk 60 and/or the blade platform 64 may be utilized.

Figure 3:
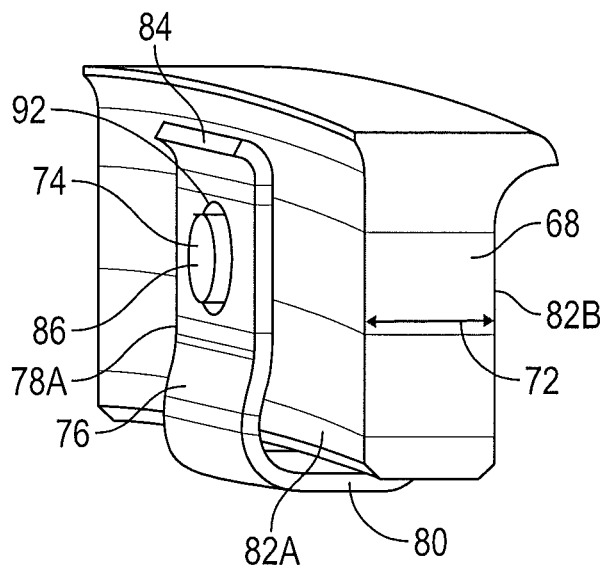
FIG. 3 is a partial perspective view of a balance arrangement at a rotating component structure of a gas turbine engine.
Figure 4:
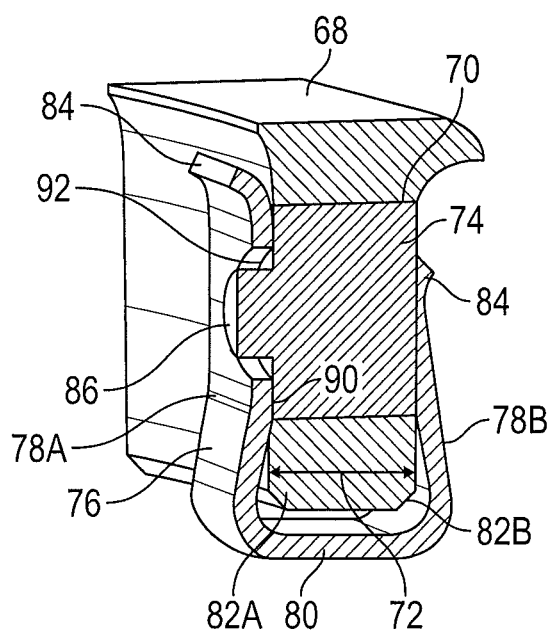
FIG. 4 is a cross-sectional view of a balance arrangement at a rotating component structure of a gas turbine engine.
Figure 5:
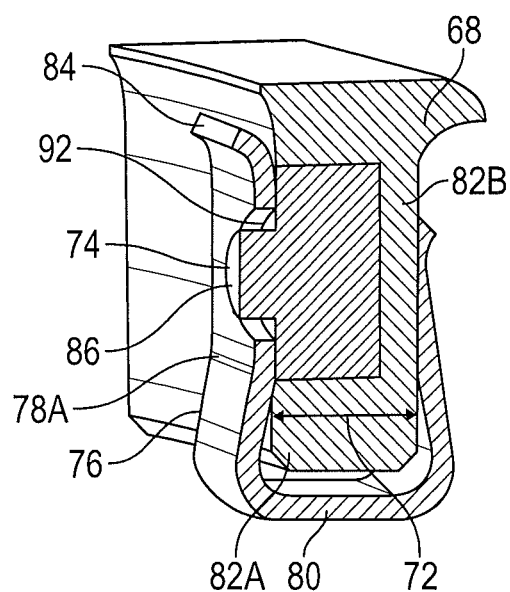
FIG. 5 is another cross-sectional view of a balance arrangement at a rotating component structure of a gas turbine engine.

Referring now to FIGS. 3 and 4, the balance flange 68 includes a plurality of openings 70 therein. In some embodiments, the openings 70 are through-openings extending entirely through a flange thickness 72 of the balance flange 68, while in other embodiments such as shown in FIG. 5, the openings 70 extend only partially through the flange thickness 72.

Referring again to FIG. 4, a balance pin 74 is inserted into one or more of the openings 70. A balance clip 76 is installed over the balance pin 74 at the opening 70 to retain the balance pin 74 at the opening 70. The balance clip 76 includes two clip legs 78 extending from a clip base 80. The balance clip 76 is installed onto the balance flange 68, with a first clip leg 78a at a first flange side 82a and a second clip leg 78b at a second flange side 82b. In a free state, a distance between clip legs 78a and 78b is less than the flange thickness 72. As such, when the balance clip 76 is installed on the balance flange 68 the balance clip 76 deflects over the balance flange 68. When the balance clip 76 is installed, the clip legs 78a and 78b exert a force on the balance flange 68 and the balance pin 74 to retain the balance pin 74 in the opening 70. In some embodiments, the clip legs 78a and 78b include leg ends 84 that are curved outwardly to allow for easier installation of the balance clip 76 onto the balance flange 68.

In some embodiments, the balance pin 74 includes a pin protrusion 86 extending outwardly from a pin end defining a pin shoulder 90. When the balance pin 74 is installed in the opening 70, the pin protrusion 86 extends beyond a flange side 82. The clip leg 78 includes a complimentary leg opening 92 into which the pin protrusion 86 extends when the balance clip 76 is installed onto the balance flange 68. This arrangement allows the balance clip 86 to maintain position at the balance pin 74. In other embodiments, the configuration may be substantially reversed, such as the clip leg 78 including a leg protrusion, which is received in a dimple or the like formed in the balance pin 74.

Figure 6:
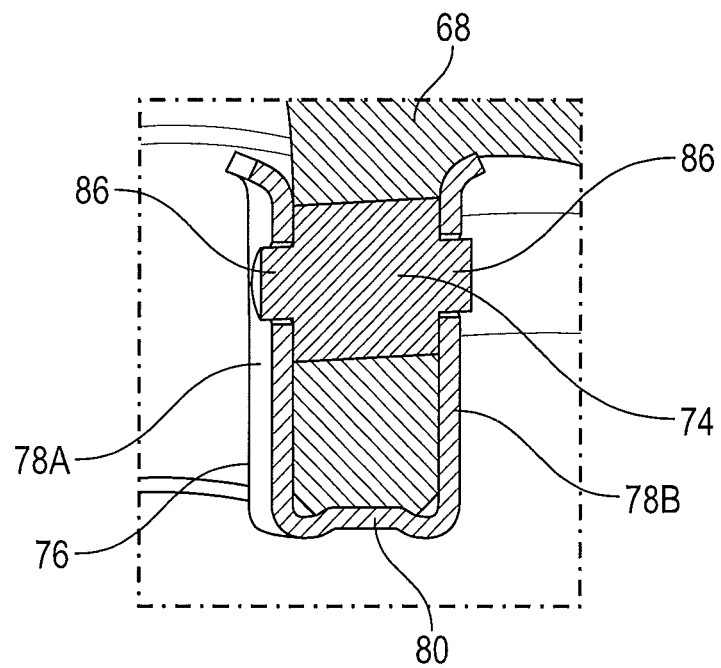
FIG. 6 is another cross-sectional view of a balance arrangement at a rotating component structure of a gas turbine engine.

In the embodiment of FIG. 4, only one clip leg 78 includes a leg opening 92 to receive a pin protrusion 86, while in another embodiment shown in FIG. 6 both clip legs 78 include leg openings 92 to receive pin protrusions 86.

Placement of the balance pins 74 and balance clips 76 at selected locations around the circumference of the balance flange 68 corrects an imbalance of the turbine rotor 58. Further, the configurations of individual balance pins 74 may be varied to aid in tuning of the turbine rotor 58 balance. For example, balance pins 74 at different circumferential locations in the balance flange 68 may be formed from different materials, such that the balance pin 74 masses differ.

Figure 7:
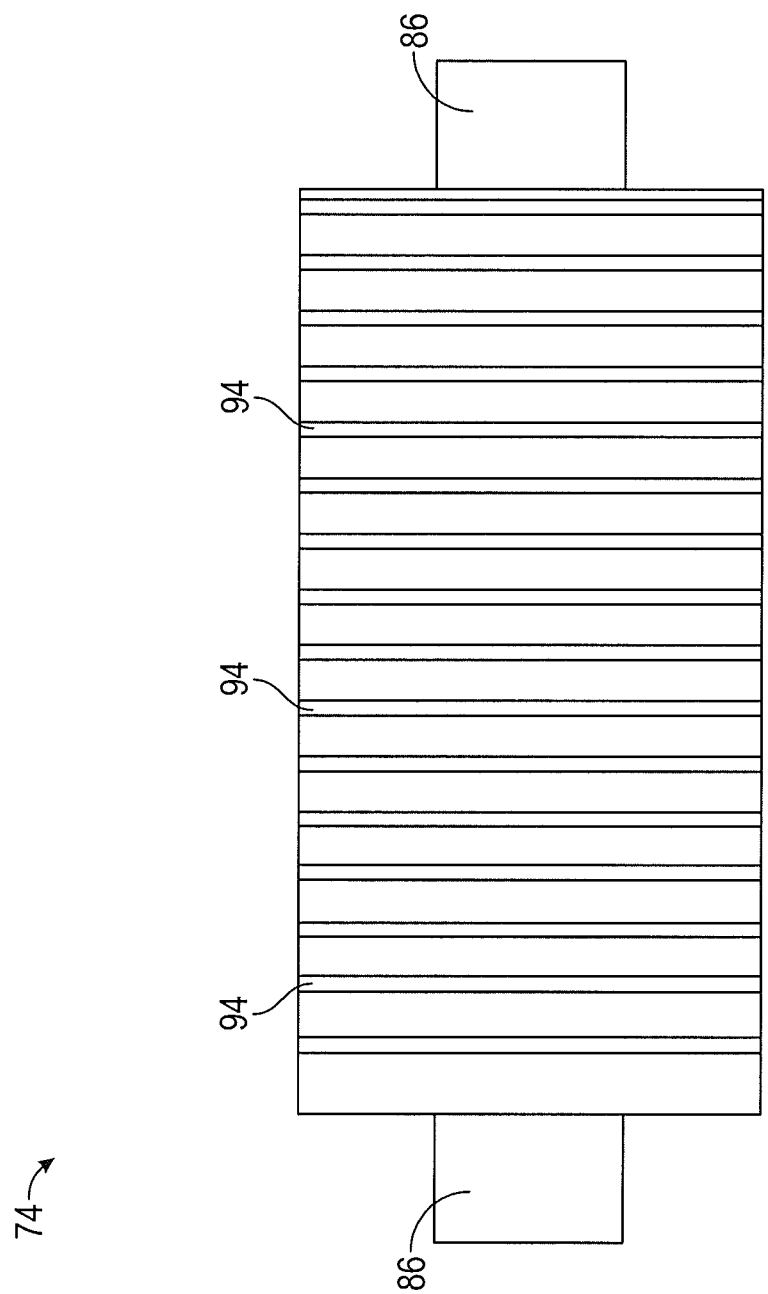
FIG. 7 is a cross-sectional view of an embodiment of a balance pin.

Further, as shown in FIG. 7, the balance pin 74 may include pin grooves 94 to reduce the mass of the balance pin 74 compared to a balance pin 74 without pin grooves 94. In the embodiment of FIG. 7, the pin grooves 94 extend circumferentially about the balance pin 74. In other embodiments, however, the pin grooves 94 may extend, for example, axially or helically about the balance pin 74. Further, other modifications to the shape of the balance pin 74 may be utilized to reduce the mass of the balance pin 74. Such modifications may include, for example, scallops.

The balance pin 74 and balance clip 76 arrangements disclosed herein provide an easy and relatively quick to install and remove solution to correct rotating component or assembly imbalance. Further, no special tools, such as a rivet flaring tool, are required for installation. Additionally, the arrangement may be used in relatively small spaces that solutions requiring special tools cannot be used. Further, the balance pin 74 and balance clip 76 are simple and easily manufactured.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A balancing assembly for a rotating component of a gas turbine engine, comprising: a balance pin configured for insertion into an opening in the rotating component, the rotating component of the gas turbine engine including a disc, a platform extending from the disc, and a balancing flange extending from the platform, the opening disposed in the balancing flange; and a balance clip configured for installation to the balancing flange over the balance pin to retain the balance pin in the opening via exertion of a retention force on the balance pin; wherein the balance clip includes two clip arms extending from a clip base, the clip arms configured to extend along opposing sides of the balancing flange; and wherein a distance between the clip arms in a free state is less than a distance between the opposing sides of the balancing flange.

2. The balancing assembly of claim 1, further comprising a curved clip arm tip to improve insertion of the balance clip onto the balancing flange.

3. The balancing assembly of claim 1, wherein the balance pin includes a pin protrusion receivable into a clip opening in the balance clip.

4. The balancing assembly of claim 3, wherein a pin shoulder is defined in the balance pin at the pin protrusion.

5. The balancing assembly of claim 1, further comprising one or more grooves or scallops in the balance pin.

6. A rotating assembly of a gas turbine engine, comprising: one or more rotating components including one or more balancing openings, the rotating component of the gas turbine engine including a disc, a platform extending from the disc, and a balancing flange extending from the platform, the balancing opening disposed in the balancing flange; and a balancing assembly disposed at a balancing opening of the one or more balancing openings, including: a balance pin inserted into the balancing opening in the balancing flange; and a balance clip installed to the balancing flange over the balance pin to retain the balance pin in the balancing opening via exertion of a retention force on the balance pin; wherein the balance clip includes two clip arms extending from a clip base, the clip arms configured to extend along opposing sides of the balancing flange; and wherein a distance between the clip arms in a free state is less than a distance between the opposing sides of the balancing flange.

7. The rotating assembly of claim 6, further comprising a curved clip arm tip to improve insertion of the balance clip onto the balancing flange.

8. The rotating assembly of claim 6, wherein the balance pin includes a pin protrusion receivable into a clip opening in the balance clip.

9. The rotating assembly of claim 8, wherein a pin shoulder is defined in the balance pin at the pin protrusion.

10. The rotating assembly of claim 6, further comprising one or more grooves or scallops in the balance pin.

11. The rotating assembly of claim 6, wherein the one or more rotating components includes a turbine rotor.

12. A method of correcting an imbalance of a rotating assembly of a gas turbine engine, comprising: inserting a balance pin into a balancing opening in a rotating component of the rotating assembly, the rotating component of the gas turbine engine including a disc, a platform extending from the disc, and a balancing flange extending from the platform, the balancing opening disposed in the balancing flange; and installing a balance clip at the balancing opening over the balance pin to retain the balance pin in the balancing opening via exertion of a retention force by the balance clip on the balance pin; wherein the balance clip includes two clip arms extending from a clip base, the clip arms configured to extend along opposing sides of the balancing flange; and wherein a distance between the clip arms in a free state is less than a distance between the opposing sides of the balancing flange.

13. The method of claim 12, further comprising inserting a pin protrusion of the balance pin into a clip opening of the balance clip to retain the balance clip at the balance pin.

* * * * *